(12) United States Patent
Ito

(10) Patent No.: US 7,188,761 B2
(45) Date of Patent: Mar. 13, 2007

(54) READ-WRITE DEVICE FOR A SMART CARD FOR USE WITH A HOUSING

(75) Inventor: Yoshitaka Ito, Hachiouji (JP)

(73) Assignee: Asahi Seiko Co., Ltd., Tokyo (JP)

( * ) Notice: Subject to any disclaimer, the term of this patent is extended or adjusted under 35 U.S.C. 154(b) by 337 days.

(21) Appl. No.: 10/760,825

(22) Filed: Jan. 20, 2004

(65) Prior Publication Data

US 2004/0208051 A1    Oct. 21, 2004

(30) Foreign Application Priority Data

Jan. 20, 2003    (JP)    ............................. 2003-011567

(51) Int. Cl.
*G06K 5/00*    (2006.01)
*G07F 19/00*    (2006.01)
*G06F 7/08*    (2006.01)

(52) U.S. Cl. ........................ 235/380; 235/379; 235/381

(58) Field of Classification Search ........ 235/379–381; 705/43

See application file for complete search history.

(56) References Cited

U.S. PATENT DOCUMENTS

| 5,438,184 | A | | 8/1995 | Roberts et al. | |
| 5,600,122 | A | * | 2/1997 | Isono et al. | .................. 235/483 |
| 6,021,944 | A | * | 2/2000 | Arakaki | ...................... 235/380 |
| 6,296,182 | B1 | * | 10/2001 | Ota et al. | .................... 235/379 |
| 6,357,657 | B1 | * | 3/2002 | May | ........................... 235/441 |
| 6,554,185 | B1 | * | 4/2003 | Montross et al. | ........... 235/379 |

FOREIGN PATENT DOCUMENTS

| JP | 9-180022 | 7/1997 |
| JP | 11-353427 | 12/1999 |

* cited by examiner

*Primary Examiner*—Thien M. Le
*Assistant Examiner*—April A. Taylor

(57) ABSTRACT

A value medium dispensing unit having a read/write device for operatively communicating with a user device capable of recording value information includes a housing having an opening on a vertical side, and a read/write device operatively mounted within the opening having a receptor surface that extends at a slanted angle to the vertical side. The receptor surface has a size to enable contact with a user device such as a smart card when it is at least partially inserted within the opening whereby an operative receptor surface is partially recessed within the housing and positioned to facilitate a user interface.

12 Claims, 4 Drawing Sheets

READ-WRITE DEVICE FOR A SMART CARD FOR USE WITH A HOUSING

BACKGROUND OF THE INVENTION

1. Field of the Invention

The present invention is directed to a read-write device for interfacing with a smart card, and more particularly, to the structure and positioning of such a read-write device on a housing that can dispense items of value.

2. Description of Related Art

Various forms of kiosks, money exchanging devices, ticket dispensers, etc., have been commonly used to facilitate the electronic transfer of funds associated with a value medium dispensing device which can dispense a predetermined medium corresponding to a received value information. Such an exchanging device which discriminates value information that has been memorized, for example, on a smart card (non-contact type IC card) through a communicating device and dispenses a value medium corresponds to the discriminated value. In this regard, the term "value information" is a generic term which can be referred to as money, point system, etc. "Value medium" is a generic term which can be a source of barter or exchange and converted into money, tokens, goods, etc.

Such exchanging devices which will dispense a value medium based on value information is known in the art. Examples of exchanging devices can be found, for example, in Japanese Laid-open Patent Application 9-180022. An exchange device can include a banknote slot, a coin slot, a dispensing unit which dispenses the value medium corresponding to the value information, and a receiving slot for receiving the dispensed value medium. When transactions are completed by using a smart card, usually the smart card includes an IC memory which will memorize and store the value information and is capable of communicating that information in a secured manner without contact. Generally, the smart card can be placed at a particular location and can be polled to broadcast the contents of the smart card and can be further refreshed to update or subtract value information stored in the smart card.

Frequently problems can occur in electronically interfacing with a smart card. For example, an embedded antenna within the smart card can communicate by an electromagnetic wave, and if a magnetic material is placed near the antenna, the effect of the electromagnetic waves can be reduced or absorbed. While it is frequently desired to utilize a metal case for security purposes for storing the value medium, if an antenna is normally attached to such an exterior metal case housing, communication with the smart card may be interfered with.

An example of a location of an antenna on a dais is shown, for example, in Japanese Laid-open Patent Application 11-353427. Increasing the setup area, however, reduces the effective height of the exchanging device and the capability of storing value medium.

This, there is a desire in the prior art to improve the structure and location of a read/write device that will electronically interface, for example, with a user smart card and the manner in which it is located and utilized on a value medium exchanging device.

SUMMARY OF THE INVENTION

A value medium dispensing unit having a read/write device for operatively communicating with a user device capable of recording value information such as a smart card is provided. The dispensing unit can have a vertical front relative to a support surface with an opening on the vertical side, and a composite read/write device can be operatively mounted within this opening to present a receptor surface that will extend at a slanted angle to the vertical side. The receptor surface is of a size to optimally contact with the user device when the user device is at least partially inserted within the opening, whereby the operative receptor surface is partially recessed without unduly limiting the internal space of the value medium dispensing unit and can be optimally positioned to facilitate a user interface. Thus, the slanted angle can be preferably positioned to accommodate a natural positioning and holding of, for example, a smart card on the receptor surface.

The read/write device can be easily replaced or updated and has a composite configuration of a receptor surface faceplate that may include information such as indicia indicating particular monetary values. The receptor surface faceplate is positioned over a spacer having at least one or more recesses to receive one or more antenna units that can be mounted within the recesses to interface with the user device such as a smart card. A support member can locate the antenna units within the spacer so that an oblong rectangular surface is partially extended outside the vertical plane of the housing with a recessed area to further accommodate the positioning of, for example, a smart card on the receptor surface.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

Reference will now be made in detail to the preferred embodiments of the invention which set forth the best modes contemplated to carry out the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
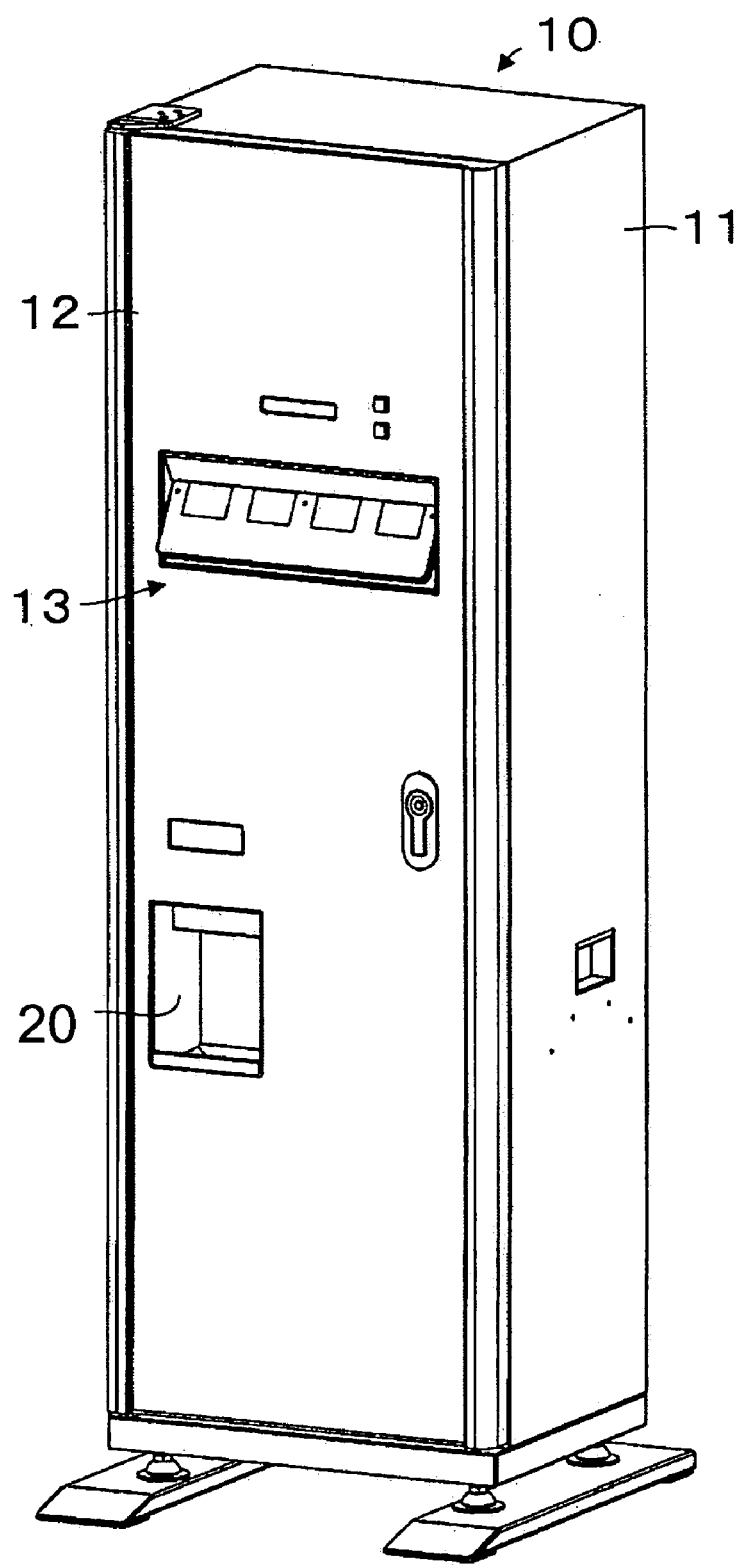
FIG. 1 is a perspective view of a kiosk such as a value medium dispensing unit incorporating the read-write device of the present invention.
Figure 2:
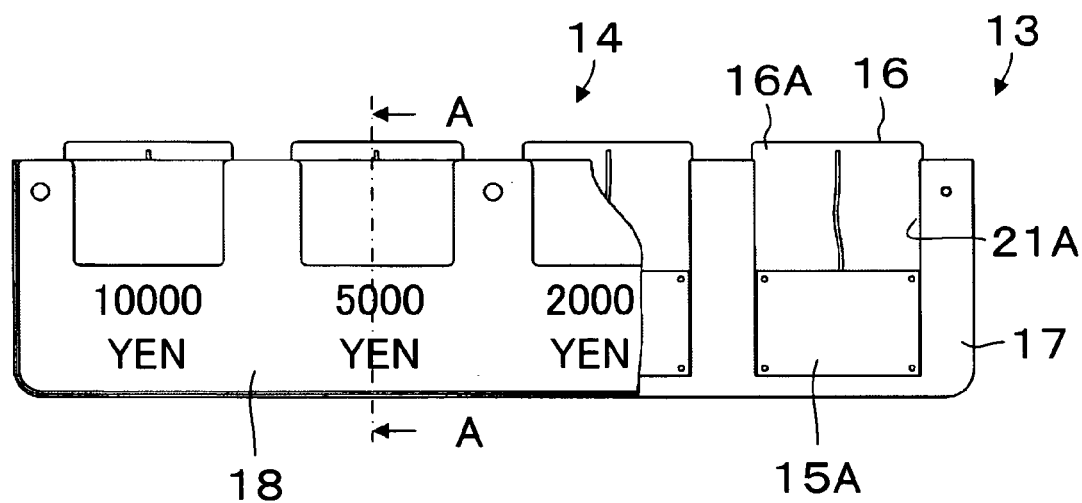
FIG. 2 is a partially elevated view disclosing the composite read/write device of the present invention.

This embodiment is an example of a read/write unit which is built into an exchanging device (a token dispensing device). However, this present invention can be used as a read/write unit which is built into a vending machine, etc. In FIG. 1, token dispensing device 10 has a box-like configuration that includes body 11, and a front cover 12 which closes the opening of the body 11. A processing unit for value information such as a CPU system and a dispensing unit for a value medium are located in body 11 as known in this industry. The front cover 12 can be opened so that the built-in units can be checked, maintained or value mediums can be supplied by an attendant. Front cover 12 is perpendicular to the support surface, and read/write unit 13 is located at an upper middle section, and a receiving slot 20 for dispensing the value medium is located at a lower left section of the body 11.

Smart card SC can be contacted at (or approximate) a predetermined section of an upper receptor surface of read/write unit 13 by a user. Accordingly, smart card SC can communicate with an antenna and a predetermined electronic process can be executed. In the process, when a valid value information is received, a dispensing unit for the value medium is activated, and the appropriate value mediums based on the valid value information polled are dispensed to receiving slot 20.

Next, a possible structure of read/write unit 13 is explained. Read/write unit 13 includes a unit case 14, and antenna boards 15A, 15B, 15C, and 15D for communication with a user device such as a smart card.

Figure 3:
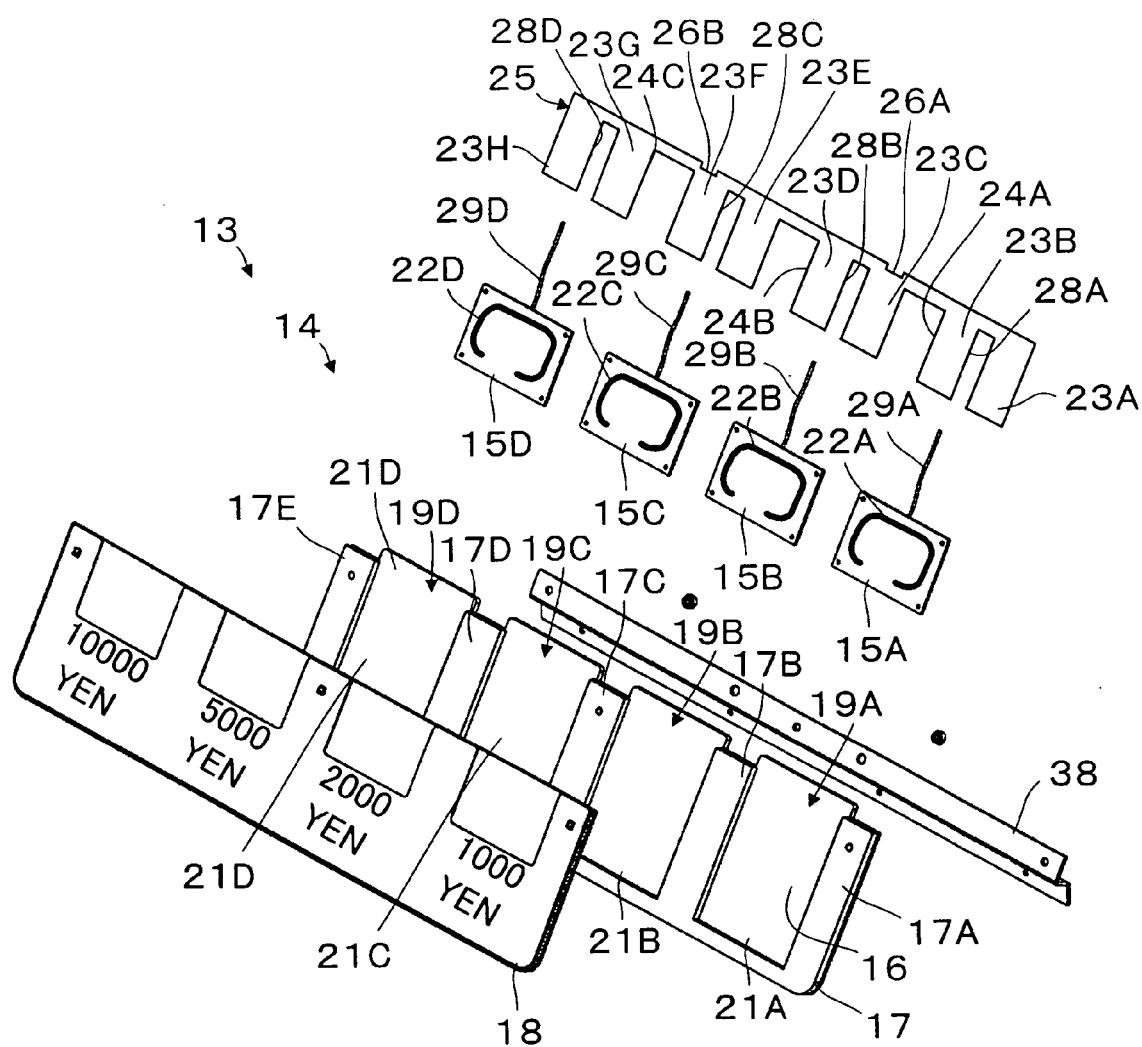
FIG. 3 is an exploded view of the read/write device and support bracket of the present invention.

Unit case 14 shown in FIG. 3 includes a back plate 16 which is oblong in shape, a spacer 17 which has an indent upward fork shape, and a front plate 18 which is also oblong. These elements can be made from a nonmagnet resin such as molded plastic.

The distances between each fork-claw 17A, 17B, 17C, 17D, 17E of spacer 17 are slightly bigger than the width of antenna bases 15A, 15B, 15C, 15D and the thickness are slightly thicker than the antenna base to form a plurality of recesses. Also, spacer 17 is sandwiched between back plate 16 and front plate 18, and they can be unified by an adhesive material.

Therefore, unit case 14 is a composite landscape positioned oblong plate and is made up of antenna holes 21A, 21B, 21C, 21D which are rectangular-like in shape and include insert openings 19A, 19B, 19C, 19D. The unit case 14 can be made up of integral molded parts of resin.

Antenna bases 15A, 15B, 15C, 15D are inserted correspondingly into antenna holes 21A, 21B, 21C, 21D through insert openings 19A, 19B, 19C, 19D to have contact with these bottoms. Antennas 22A, 22B, 22C, 22D and communicating circuits are mounted on each antenna base 15A, 15B, 15C, 15D. Meanwhile, only antennas 22A, 22B, 22C, 22D which have adequate receiving strength should be inserted into antenna holes 21A, 21B, 21C, 21D.

Forked supporter 25 has concave sections 24A, 24B, 24C, 24D corresponding to the fork-claws 17A, 17B, 17C, 17D, 17E and is inserted into antenna holes 21A, 21B, 21C, 21D through insert openings 19A, 19B, 19C, 19D. Supporter 25 has salients 23A, 23B corresponding to antenna hole 21A, salients 23C, 23D corresponding to antenna hole 21B, salients 23E, 23F corresponding to antenna hole 21G, salients 23G, 23H corresponding to antenna hole 21D.

Figure 4:
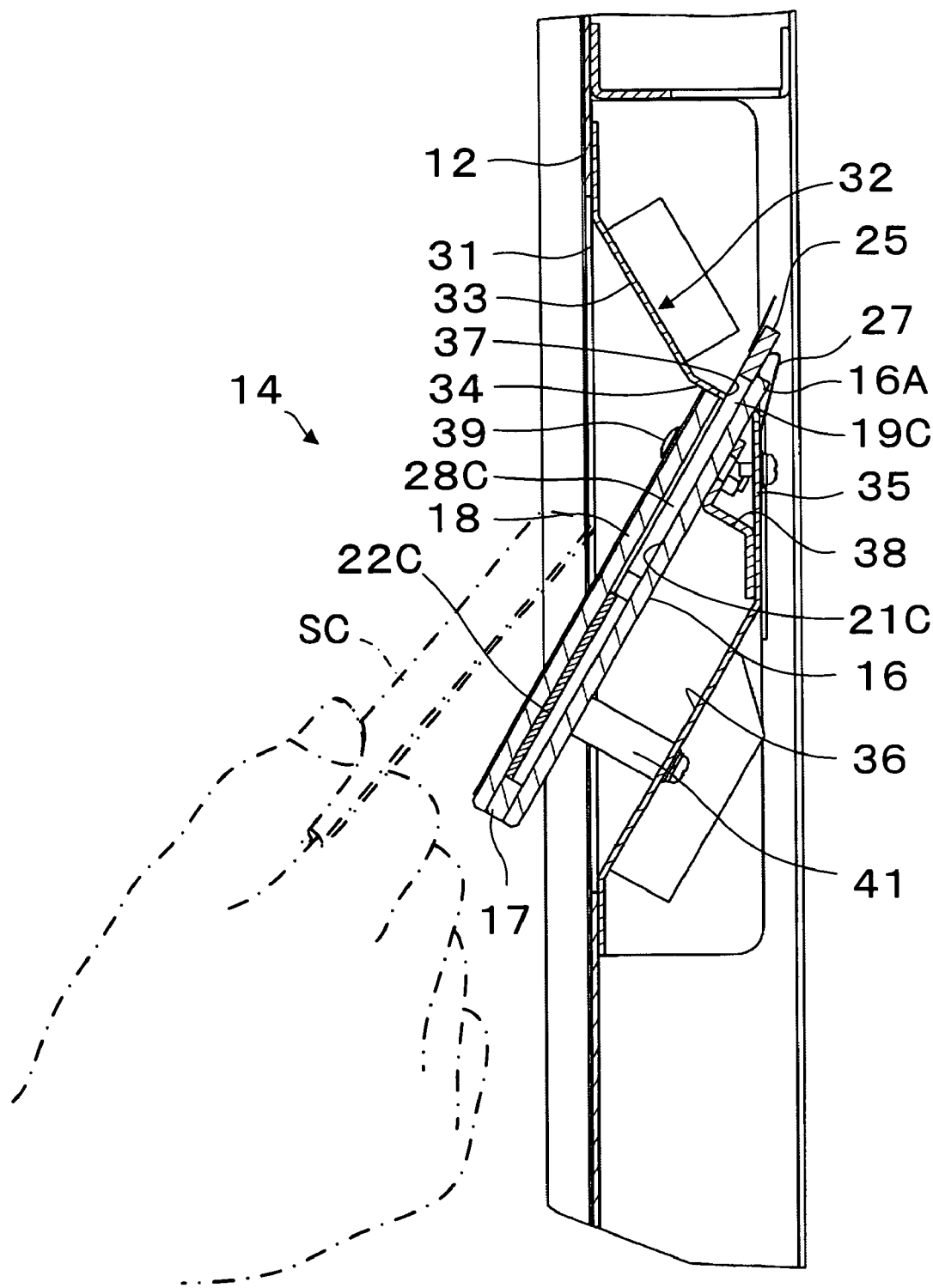
FIG. 4 is a schematic partial cross-sectional view of the read/write device operatively positioned in a recessed opening of the value medium dispensing unit.

Accordingly, these tops of salients are struck to each antenna base 15A, 15B, 15C, 15D and are pushed to notches 26A, 26B by a hook 27, as seen in FIG. 4, which can be made up of leaf springs. The lower sections of hook 27 are fixed at an after-mentioned perpendicular section 35. Supporter 25 could be eliminated; however, communicating errors may occur because the locations of antenna bases 15A, 15B, 15C, 15D could be changed by vibration.

Lead wire 29A of antenna base 15A is located in groove 28A between salients 23A and 23B, lead wire 29B of antenna base 15B is located in groove 28B between salients 23C and 23D, lead wire 29C of antenna base 15C is located in groove 28C between salients 23E and 23F, and lead wire 29D of antenna base 15D is located in groove 28D between salients 23G and 23H. The amount of monetary denomination which can be stored on the smart card is located as indicia on the surface receptor plate 18 corresponding to each inserted antenna.

1000 YEN corresponding to antenna 22A, 2000 YEN corresponding to antenna 22B, 5000 YEN corresponding to antenna 22C and 10000 YEN corresponding to antenna 22D are signed as shown in FIG. 3. When smart card SC gets close to the selected monetary sign, the selected antenna communicates a predetermined value information to smart card SC. The value information can be freely selected. Also, when the information of money is only one currency amount, then only one antenna is necessary.

Also, an antenna and additionally some amount of money button can be located on the housing 10, and the value information corresponding to a selected money button can be communicated. Unit case 14 can be changed to a non-resin material which does not absorb the electromagnetic waves.

Next, an attaching structure for unit case 14 to front cover 12 is explained with reference to FIG. 4. Opening 31 is landscape oblong shape and is located at the upper middle section of front cover 12. Auxiliary cover 32 is made of iron and is concave in cross-section and is welded at its rear around opening 31 of front cover 12. In other words, auxiliary cover 32 is a part of front cover 12, because it is unified to front cover 12.

Auxiliary cover 32 includes a first downward slanting section 33, a second downward slanting section 34, a perpendicular section 35 and an upward slanting section 36. Downward slanting section 33 continues from the upper edge of opening 31 and extends towards the interior of exchanging device 10 and downward. Upward slanting section 36 extends towards the front cover 12 and downward. The slanting angle of second downward slanting section 34 to front cover 12 is larger than downward slanting section 33. Unit attaching opening 37 is a landscape oblong slit and is located at the second downward slanting section 34. The slanting angle of unit case 14 to front cover 12 is rather small, because the slanting angle of second downward slanting section 34 slants to a larger degree than first downward slanting section 33. Therefore, with the protruding amount of the lower section of unit case 14, the area of unit case 14 is larger and the protruding amount of unit case 14 into the body 11 is decreased. In other words, antennas 22A, 22B, 22C, 22D are located at a predetermined position; however, the protruding amount is rather smaller. As a result, the storing amount of the value mediums within the body is not reduced.

Also, perpendicular section 35 can be changed to an upward slanting section 36 which continues to downward second slanting section 34. In this structure, the protruding amount of the attaching section of unit case 14 increases; however, the storing amount of the value medium is slightly reduced. Therefore, when there is perpendicular 35, downward slanting section 34 is included to substantially continue to upward slanting section 36.

Upper section 16A of rear plate 16 of unit case 14 is inserted into unit attaching opening 37. The upper end of front plate 18 has contact with the second downward slanting section 34. In this situation, unit case 14 is fixed at a bracket 38 by one or more fasteners 39. Bracket 38 is crank-like in shape and is welded at perpendicular section 35.

In this situation, insert openings 19A, 19B, 19C, and 19D face towards unit attaching opening 37. Also, supporter 25 can be inserted into antenna holes 21A, 21B, 21C, 21D through unit attaching opening 37 from the inside of body 11. Therefore, unit attaching opening 37 is very thin (left and right direction as shown in FIG. 4). For security purposes, the ability to destroy the front cover 12 would be difficult from unit attaching opening 37.

Unit case 14 protrudes downward in front of exchanging device 10 to form second downward slanting section 34 and the lower section slightly protrudes toward the front rather than front cover 12. Unit case 14 is fixed at pillar 41 which is fixed at the middle of upward slanting section 36 and is parallel to upward slanting section 36 at a predetermined distance.

The distance between antennas 22A, 22B, 22C, 22D and upward slanting section 36 does not provide an effect which would reduce transmission efficiency of an electromagnetic wave. Therefore, the communication between antennas 22A, 22B, 22C, 22D and smart card SC does not receive an adverse effect. If the unit case 14 has enough individual strength, pillar 41 can be eliminated.

When unit attaching opening 37 is located inside exchanging device 10 by auxiliary cover 32 as shown in the embodiment, the locating space slightly increases because the protruding amount of unit case 14 from front cover 12 is smaller. Also, the protruding amount of unit case 14 is smaller. Potential inadvertent contact with a customer does not occur by contact with such a protruding section.

Next, an operation which uses the smart card SC is explained. Smart card SC is held by the first finger and the second finger of the user. The smart card SC is positioned to contact with a predetermined money indication, for example, 1000 Yen.

By this proximity, the processing circuit accesses the value information which is memorized in the IC of smart card SC. Also, 1000 YEN is reduced from the initial value information and the balance is memorized in the IC. When the process is finished, the processing circuit generates a signal to finish the process to the customer by a sound or a light effect.

When smart card SC has contact with receptor surface of the unit case 14, unit case 14 slants downward toward the customer. Therefore, smart card SC can be contacted with a natural holding situation by a hand of the user. Also, the fifth finger of the user does not have contact with the front cover 12, because unit case 14 protrudes from front cover 12. As a result, smart card SC can be easily contacted with unit case 14 in a natural manner.

If antenna bases 15A, 15B, 15C, 15D become broken, front cover 12 will be opened, and afterward, hook 27 is taken off, and supporter 25 is pulled out so that the old antenna base can be changed to a new antenna base. Afterward, supporter 25 is reinserted, and hook 27 is hooked. Therefore, the antenna base can be easily changed. Meanwhile, in this present invention, if auxiliary cover 32 is taken off, unit case 14 can further protrude toward the front from unit case 14 which slants downward.

Those skilled in the art will appreciate that various adaptations and modifications of the just-described preferred embodiment can be configured without departing from the scope and spirit of the invention. Therefore, it is to be understood that, within the scope of the amended claims, the invention may be practiced other than as specifically described herein.

What is claimed is:

1. A value medium dispensing unit having a read/write device for operatively communicating with a user device for recording value information comprising:
   a housing having an opening on a vertical side; and
   a read/write device operatively mounted within the opening having a receptor surface that extends at a slanted angle to the vertical side, the receptor surface is of a size to contact with the user device when the user device is at least partially inserted within the opening whereby an operative receptor surface is partially recessed within the housing and positioned to facilitate a user interface, wherein the read/write device includes a receptor surface face plate, a spacer having at least one recess, and an antenna unit mounted within the recess.

2. The value medium dispensing unit of claim 1 further including a support member for locating the antenna unit in the spacer.

3. The value medium dispensing unit of claim 2 further including a support bracket for positioning the read/write device in the opening.

4. In a value medium dispensing unit which dispenses a value medium based on a recognized value from a user smart card, the improvement comprising:
   a unit opening in a front cover of the dispensing unit which is perpendicular to a support surface;
   a unit case member having a plate configuration with an operative antenna unit for receiving a recognized value from the smart card; and
   a mounting assembly for holding the unit case member to slant downward through the unit opening to position a lower section of the unit case member on an exterior of the front cover.

5. The value medium dispensing unit of claim 4 wherein the front cover further includes a downward section extending from the front cover to an interior of the unit opening and an upward slanting section which continues to the downward section, the unit case member passes through unit opening at the downward section and extends downward parallel to the upward starting section.

6. The value medium dispensing unit of claim 5 wherein the unit case member includes receptacles for an antenna, an antenna board member mounted in the receptacles and a support member for retaining the antenna board member.

7. A dispensing unit for dispensing items purchased using a smart card, the dispensing unit comprising:
   a face plate bearing a plurality of marks representative of items to be dispensed;
   a plurality of antennas one of the plurality of antennas corresponding with one of the plurality of marks, each antenna positioned adjacent a corresponding mark to communicate with the smart card when the smart card is operatively positioned proximate to the mark representative of the item to be dispensed; and
   a receiving slot for receiving an item to be dispensed when the smart card is operatively placed near the corresponding mark on the faceplate to activate the dispensing unit;
   whereby items may be purchased from the dispensing unit by placing the smart card near the mark representative of the item to be dispensed.

8. The dispensing unit of claim 7 further comprising a non-metallic spacer member for separating each of the plurality of antennas supported by the face plate.

9. The dispensing unit of claim 8 further comprising a forked support member with fines, each tine connected to a base on which one of the plurality of antennas is mounted.

10. The dispensing unit of claim 7 wherein the face plate is mounted at an oblique angle to a front surface of a housing for the dispensing unit.

11. The dispensing unit of claim 7 wherein the dispensing unit dispenses tokens.

12. The dispensing unit of claim 7 wherein each of the plurality of antennas reads a monetary value from the smart card and writes an updated value to the smart card.

* * * * *